A. BURHAUS.
Potato Digger.
No. 81,980. Patented Sept. 8, 1868.
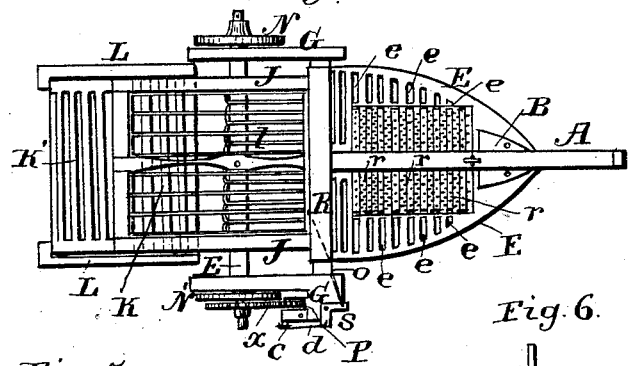
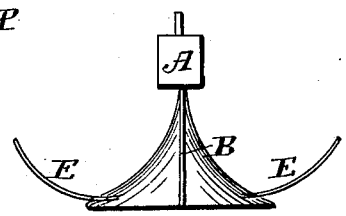
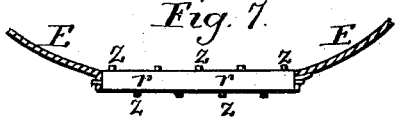
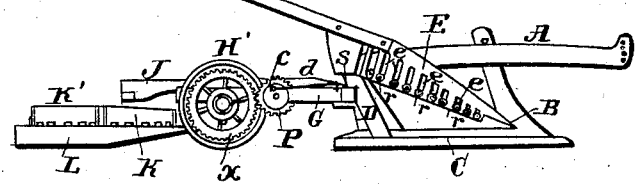
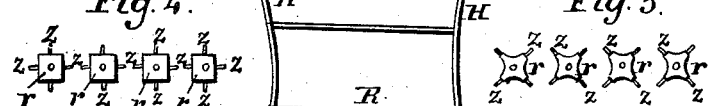
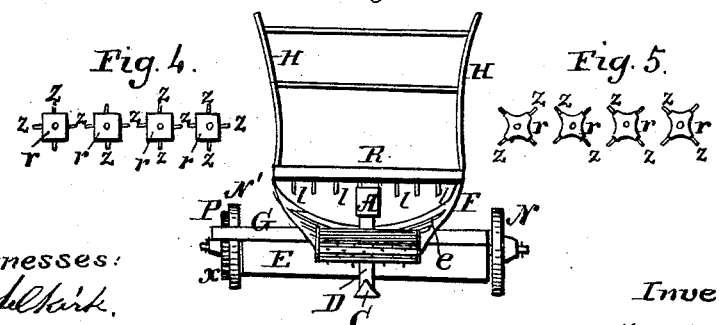
Witnesses:
Inventor:

United States Patent Office.

ALBERT BURHAUS, OF ALBANY, NEW YORK, ASSIGNOR TO HIMSELF AND HENRY H. BURHAUS, OF SAME PLACE.

*Letters Patent No. 81,980, dated September 8, 1868.*

---

IMPROVEMENT IN POTATO-DIGGERS.

---

The Schedule referred to in these Letters Patent and making part of the same.

---

TO ALL WHOM IT MAY CONCERN:

Be it known that I, ALBERT BURHAUS, of the city and county of Albany, State of New York, have invented certain Improvements in Potato-Diggers, whereby potatoes may be dug out and lifted from the ground and passed into boxes; and I do hereby declare that the following is a clear, full, and exact description thereof, reference being had to the accompanying drawings, forming part of this specification, in which—

Figure 1 is a vertical view from above.

Figure 2 is a longitudinal cross-section through digging part, and side view gear to operate sifter.

Figure 3 is a lateral cross-section of digger with gear back.

Figures 4 and 5 are end views of rollers.

Figure 6 is front view of shear, showing the connection of the same with the scoop.

Figure 7 is a longitudinal section of rollers and manner of securing the same with the scoop.

The nature of my invention consists of a digging part, and a sifting and sorting part, and may be used together, or the digger alone may be used. The digging part consists of a double share attached to a beam similar to that of a plow. Attached to this double share is a shoe, which runs back about twenty inches, and steadies the movement of the digger. Starting from the rear of the double share is a scoop, which rises up on an incline which would elevate the rear end of the said scoop about twelve inches (more or less) higher than the front end, where connected with the share. The centre of the said scoop is provided with a square opening about ten inches wide, and runs nearly to its rear end. In this opening is placed a number of rollers, and said rollers are provided with projections, against which the soil strikes, when the machine is being drawn forward, and causes the said rollers to revolve, carrying up and at the same time breaking the earth.

The parts of the scoop on either side of the rollers, between the outer edge of the scoop and rollers, are slotted in a lateral direction, and permit the loose soil dropping through.

Back of the scoop is attached a carriage, supporting a vibratory-sieve, which is operated by a rod and crank worked by a pinion and gear, the gear being attached to one of the wheels of the carriage. Two sled-runners, supporting two boxes, are attached to the axle of the carriage, and receive the potatoes as they fall from the sieve, the smaller ones falling through the meshes into the first box, while the larger ones fall over the end of the sieve-frame into the rear box.

To enable others skilled in the art to make and use my invention, I will proceed to describe it in reference to the accompanying drawings, and the letters of reference marked thereon, the same letters indicating like parts.

A, figs. 1, 2, 3, and 6, is a draw-beam, to which is attached the double share B, figs. 2 and 6. Connecting with this share, and running back, is a land-shoe, C, fig. 2. Fastened to the rear end of the said land-shoe is the back-support D, which connects with the rear end of the beam, and running up, is mortised to the rake-head R, fig. 3, which is provided with spike-teeth, $t\ t$.

A scoop, E, made of cast or struck metal, is attached to the double share B, figs. 1, 2, and 6. The said scoop is provided with slots, $e\ e\ e\ e$, about one inch wide, as shown in figs. 1, 2, and 3. The said slots run in a lateral direction from the sides toward the centre, in which are placed a number of rollers, $r\ r$, figs. 1, 2, and 3. The said rollers $r$ may be of any suitable form, as in figs. 4 and 5, and are provided with projections, $z\ z\ z\ z$, placed irregularly and at suitable distances apart around the said rollers.

The scoop E runs back on an incline from the double share to the rear end of the beam A, while its sides turn up and fasten to the handles H H, figs. 2 and 3. The said handles run back to a suitable distance, and are stiffened by cross-bars, as in a plow.

Made separate and attached to the rear end of the digging part, is the carriage-frame G, figs. 1 and 2. The said frame supports and carries the shaking-apparatus, which works the sieve J.

The wheels N N' on the axle F support and carry the frame G and sieve J, and one of the wheels N' has attached to it the gear-wheel $x$, figs. 1, 2, and 3, which works a pinion, $p'$. The said pinion $p$ operates a crank, $c$, that works a shaker-piece, $s$, by means of a rod, $d$. The shaker-piece works a rod, $o$, which operates the sieve J, and moves it in a vibratory manner on its pivot, $i$, which is placed in the centre and connects with the axle F.

Attached to the rear side of the axle F are two sled-runners, L L, figs. 1 and 2, on which are placed two slotted-bottomed boxes, K K′, into which the potatoes drop from the sieve. The sieve has two sizes of meshes, the smallest for the dirt to fall through and the largest for the small potatoes to pass through into the box K below. The runners L L are attached to the axle F by suitable hooks, or their equivalents, provided on the front end of the runners, and working in eyes or staples placed on the rear side of the axle.

The mode of operation with this machine is as follows:

As the machine is drawn forward, the double share B passes under and through the centre of the hill, and turns the hill with ground and potatoes to both sides. In thus turning the contents of the hill, the surface soil is cast on the sides of the scoop E, while most of the potatoes are exposed on the top, and the soil is considerably broken. The concave sides of the scoop cause the soil with the potatoes to slide toward the centre of the scoop, and upon the rollers $r\ r$, which are made to revolve by the resistance offered by the soil in contact, and by the revolving of the rollers the soil is yet more broken and separated from the potatoes, the soil working through between the rollers and the slots $e\ e$ in the sides of the scoop, and by the time the contents of the scoop are carried to its rear end, the potatoes alone, (most of the soil will have passed through the slots and between the rollers,) or with some large lumps of soil, will fall over into the sieve J, which, worked as has been described, separates the remaining soil from the potatoes and permits the small ones dropping into the box K′, while the large ones fall into the box K′, carried by the sled-runners L L, which, when filled, are to be emptied.

By these improvements the potatoes are raised from their hills, loosened, and separated from the soil, without the heavy gear-machinery generally used.

The whole is simple in construction, and is adapted to the wants of large or small growers of potatoes, and can be generally used in most soils in which they are raised.

Having described my invention, what I claim, and desire to secure by Letters Patent, is—

1. The scoop E, furnished with the lateral slots $e\ e\ e$, in combination with the rollers $r\ r$, or their equivalents, as and for the purpose set forth and described.

2. The double share B, in combination with the land-shoe C and the scoop E, as and for the purpose set forth and described.

3. The sieve J, operated by the rod $o$, shaker-piece $s$, rod $d$, crank $c$, pinion $p$, and gear $x$, and all in combination with the wheels N N′, and frame G and axle F, as and for the purpose set forth and described.

4. The sled-runners L L and boxes K K′, in combination with the sieve J and its carriage, as and for the purpose set forth and described.

ALBERT BURHAUS.

Witnesses:
ALEXANDER SELKIRK,
HENRY H. BURHAUS.